(12) United States Patent
Gouda et al.

(10) Patent No.: US 11,230,628 B2
(45) Date of Patent: Jan. 25, 2022

(54) RESIN MICROPARTICLE PRODUCTION METHOD AND RESIN PARTICLES

(71) Applicant: Sumitomo Chemical Company, Limited, Tokyo (JP)

(72) Inventors: Kenji Gouda, Niihama (JP); Toshiaki Sugimura, Niihama (JP); Shinji Ohtomo, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 34 days.

(21) Appl. No.: 16/475,584

(22) PCT Filed: Dec. 25, 2017

(86) PCT No.: PCT/JP2017/046333
§ 371 (c)(1),
(2) Date: Jul. 2, 2019

(87) PCT Pub. No.: WO2018/128108
PCT Pub. Date: Jul. 12, 2018

(65) Prior Publication Data
US 2019/0345295 A1    Nov. 14, 2019

(30) Foreign Application Priority Data
Jan. 6, 2017 (JP) .............................. JP2017-001142

(51) Int. Cl.
*C08J 3/12* (2006.01)
*C08G 75/23* (2006.01)

(52) U.S. Cl.
CPC ................ *C08J 3/12* (2013.01); *C08G 75/23* (2013.01); *C08J 2381/06* (2013.01)

(58) Field of Classification Search
CPC ....... C08J 2381/06; C08J 5/18; C08G 75/205; C08G 75/23; C08G 65/40; G01N 2030/486; C08L 81/06
See application file for complete search history.

(56) References Cited

U.S. PATENT DOCUMENTS

| | | | |
|---|---|---|---|
| 3,933,764 A | 1/1976 | McMaster | |
| 3,953,401 A | 4/1976 | Gabler et al. | |
| 4,919,992 A | 4/1990 | Blundell et al. | |
| 5,013,816 A | 5/1991 | Bobbink et al. | |

(Continued)

FOREIGN PATENT DOCUMENTS

| | | |
|---|---|---|
| CN | 1800242 A | 7/2006 |
| CN | 105086454 A | 11/2015 |

(Continued)

OTHER PUBLICATIONS

Int'l Search Report dated Apr. 3, 2018 in Int'l Application No. PCT/JP2017/046333.

(Continued)

*Primary Examiner* — Shane Fang
(74) *Attorney, Agent, or Firm* — Panitch Schwarze Belisario & Nadel LLP

(57) ABSTRACT

A resin microparticle production method includes a step of pulverizing resin particles having a thermoplastic resin as a forming material and having a BET specific surface area of equal to or more than 5 m²/g using an impact type pulverizer.

12 Claims, 2 Drawing Sheets

(56) References Cited

U.S. PATENT DOCUMENTS

| | | | |
|---|---|---|---|
| 5,215,854 A * | 6/1993 | Yamazaki | G03G 9/0825 |
| | | | 430/108.6 |
| 2004/0047782 A1* | 3/2004 | Mori | B01D 53/81 |
| | | | 423/210 |
| 2009/0280263 A1 | 11/2009 | Richter et al. | |
| 2011/0020647 A1 | 1/2011 | Makita et al. | |
| 2011/0311816 A1* | 12/2011 | Kanomata | C08G 75/23 |
| | | | 428/402 |
| 2012/0202967 A1 | 8/2012 | Wu et al. | |
| 2012/0219799 A1 | 8/2012 | Omori | |
| 2017/0081481 A1 | 3/2017 | Erbes et al. | |
| 2018/0057636 A1* | 3/2018 | Ohtomo | C08G 65/40 |

FOREIGN PATENT DOCUMENTS

| | | |
|---|---|---|
| EP | 0085014 A1 | 8/1983 |
| EP | 2502959 A1 | 9/2012 |
| EP | 2876439 A1 | 5/2015 |
| EP | 3375465 A1 | 9/2018 |
| JP | 49-110791 A | 10/1974 |
| JP | 51-037199 A | 3/1976 |
| JP | 58-145731 A | 8/1983 |
| JP | 62-185720 A | 8/1987 |
| JP | 63-168432 A | 7/1988 |
| JP | 01-081832 A | 3/1989 |
| JP | H04067912 A | 3/1992 |
| JP | 05-500379 A | 1/1993 |
| JP | 2006-015497 A | 1/2006 |
| JP | 2007231234 A | 9/2007 |
| JP | 2008-194592 A | 8/2008 |
| JP | 2013-508516 A | 3/2013 |
| JP | 2013-221071 A | 10/2013 |
| WO | 91/00876 A1 | 1/1991 |
| WO | 2009119466 A1 | 10/2009 |
| WO | 2011/062277 A1 | 5/2011 |
| WO | 2015/124521 A1 | 8/2015 |

OTHER PUBLICATIONS

Extended European Search Report dated Jun. 26, 2020 in EP Application No. 17890465.2.

Database WPI Week 201602 2015 Thomson Scientific, London, GB; AN 2015-79397X, XP002799406.

Database WPI Week 200968 2009 Thomson Scientific, London, GB; AN 2009-P20230, XP002799407.

Database WPI Week 199215 1992 Thomson Scientific, London, GB; AN 1992-121077 XP002799408.

Office Action dated Feb. 2, 2021 in JP Application No. 2017001142 (with English Machine Translation).

Office Action dated Feb. 19, 2021 in IN Application No. 201947026850.

Office Action dated May 14, 2021 in EP Application No. 17890465.2.

Office Action dated May 28, 2021 in CN Application No. 201780081802.1 (with English Machine Translation).

Hearing Notice dated Aug. 10, 2021 in IN Application No. 201947026850.

Office Action dated Sep. 28, 2021 in JP Application No. 2017001142 (with English Machine Translation).

Office Action dated Oct. 27, 2021 in KR Application No. 1020197019063 (with English Machine Translation).

Hearing Notice dated Dec. 3, 2021 in IN Application No. 201947026850.

* cited by examiner

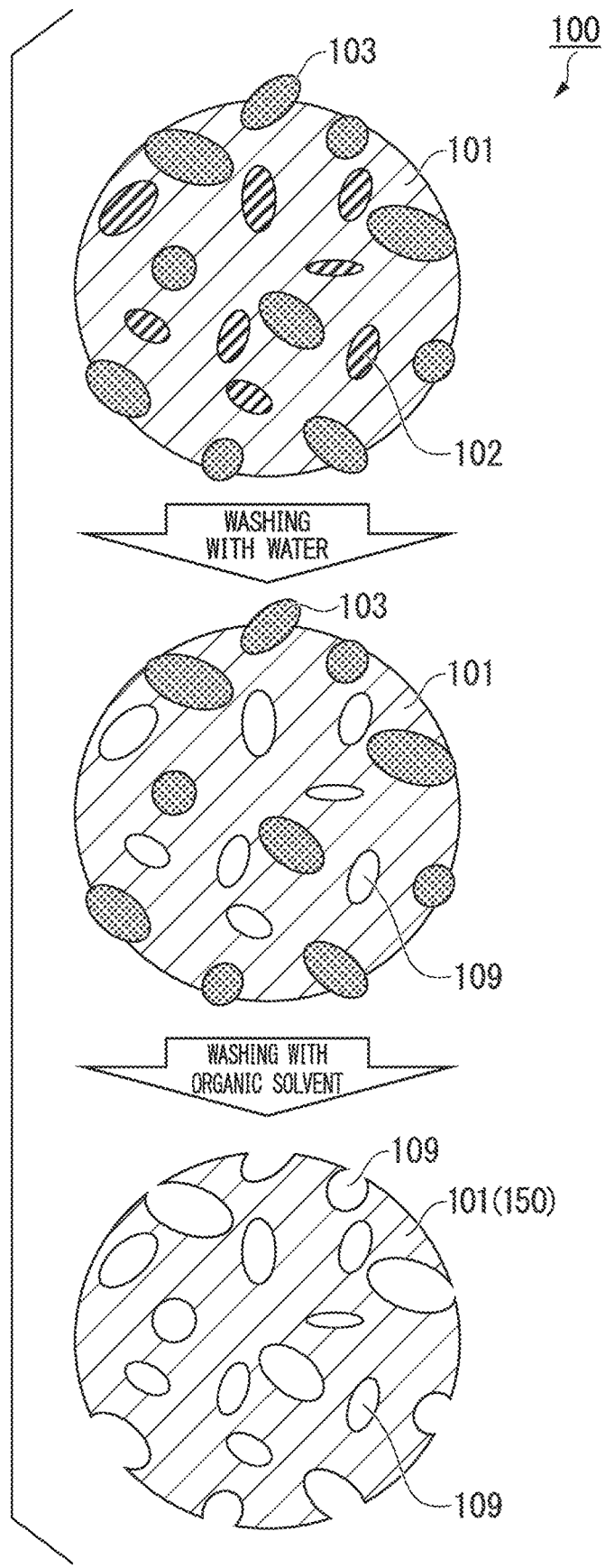

RESIN MICROPARTICLE PRODUCTION METHOD AND RESIN PARTICLES

CROSS-REFERENCE TO RELATED APPLICATIONS

This application is a Section 371 of International Application No. PCT/JP2017/046333, filed Dec. 25, 2017, which was published in the Japanese language on Jul. 12, 2018 under International Publication No. WO 2018/128108 A1, which claims priority under 35 U.S.C. § 119(b) to Japanese Application No. 2017-001142, filed on Jan. 6, 2017, the disclosures of which are incorporated herein by reference in their entireties.

TECHNICAL FIELD

The present invention relates to a resin microparticle production method and resin particles.

BACKGROUND ART

At the time of processing a thermoplastic resin into a sheet form or performing chemical processing, the thermoplastic resin is dissolved in an organic solvent to be a solution in some cases. In addition, at the time of producing a composite material obtained by dispersing the thermoplastic resin in a thermosetting resin, the thermoplastic resin is dissolved in a liquid monomer or a liquid-curable resin to be a solution in some cases. The thermoplastic resin used for such use is pulverized and microparticulated to increase a dissolution rate with respect to a liquid such as solvent or monomer in some cases.

As a method of producing microparticles of a thermoplastic resin, in general, a method of mechanically pulverizing particles of a thermoplastic resin using an impact type pulverizer is known. In the impact type pulverizer, resin particles are pulverized using impact at the time at which resin particles collide with something, such as a collision between resins, a collision between a resin and a rotating stirring vane, and a collision between a resin and a device wall surface of a pulverizer. In addition, at the time of microparticulating a large amount of resin particles, a method of performing pulverization while cooling heat generated at the time of pulverization using a cooling agent such as dry ice and liquid nitrogen is known (for example, refer to PTLs 1 and 2).

CITATION LIST

Patent Literature

[PTL 1] Japanese Unexamined Patent Application, First Publication No. S62-185720
[PTL 2] Japanese Unexamined Patent Application, First Publication No. 2006-15497

SUMMARY OF INVENTION

Technical Problem

However, in a case of a pulverization method using a cooling agent, investment in facilities for making a facility capable of using a cooling agent is required and the running cost is increased by using the cooling agent, and thus the production cost is increased.

Therefore, at the time of microparticulating resin particles at a room temperature, a method of improving processing capacity is sought.

The present invention has been made in view of such circumstances, and an object of the present invention is to provide a resin microparticle production method with improved processing capacity. In addition, another object of the present invention is to provide resin particles appropriate for microparticulation processing.

Solution to Problem

To solve the above problems, an aspect of the present invention provides a resin microparticle production method including a step of pulverizing resin particles having a thermoplastic resin as a forming material and having a BET specific surface area of equal to or more than 5 $m^2/g$ using an impact type pulverizer.

A production method according to an aspect of the present invention includes a step of polymerizing a thermoplastic resin with a solvent, a step of precipitating the thermoplastic resin from a reaction mixture obtained by the polymerizing step to obtain intermediate particles containing the thermoplastic resin, and a step of washing the intermediate particles with a fixed bed type washing apparatus to obtain the resin particles, prior to the pulverizing step.

In the production method according to an aspect of the present invention, the thermoplastic resin may have an aromatic group in a main chain.

In the production method according to an aspect of the present invention, the thermoplastic resin may have a sulfonyl group in a main chain.

In the production method according to an aspect of the present invention, the thermoplastic resin may be aromatic polyether sulfone.

In the production method according to an aspect of the present invention, a reduced viscosity (Rv) of the thermoplastic resin may be equal to or less than 0.36 dL/g.

In the production method according to an aspect of the present invention, a median particle diameter D50 of a resin particle may be equal to or more than 200 µm and a median particle diameter D50 of the resin microparticle may be equal to or less than 100 µm.

In addition, an aspect of the present invention provides resin particles having aromatic polyether sulfone as a forming material and having a BET specific surface area of equal to or more than 5 $m^2/g$.

[1] A resin microparticle production method including a step of pulverizing resin particles which are thermoplastic resin having a BET specific surface area of equal to or more than 5 $m^2/g$ using an impact type pulverizer.

[2] The resin microparticle production method according to [1] including a step of synthesizing the thermoplastic resin by polymerizing a monomer in a solvent, a step of precipitating the thermoplastic resin from a reaction mixture obtained in the synthesizing step to obtain intermediate particles containing the thermoplastic resin, and a step of washing the obtained intermediate particles in a fixed phase to obtain the resin particles, prior to the pulverizing step.

[3] The resin microparticle production method according to [1] or [2], in which the thermoplastic resin has an aromatic group in a main chain.

[4] The resin microparticle production method according to [3], in which the thermoplastic resin has a sulfonyl group in the main chain.

[5] The resin microparticle production method according to [4], in which the thermoplastic resin is aromatic polyether sulfone.

[6] The resin microparticle production method according to any one of [1] to [5], in which a reduced viscosity (Rv) of the thermoplastic resin obtained in the synthesizing step is equal to or less than 0.36 dL/g.

[7] The resin microparticle production method according to any one of [1] to [6], in which a median particle diameter $D_{50}$ of the resin particles is equal to or more than 200 μm, and a median particle diameter $D_{50}$ of the resin microparticle is equal to or less than 100 μm.

[8] Resin particles having aromatic polyether sulfone as a forming material and having a BET specific surface area of equal to or more than 5 m²/g.

Advantageous Effects of Invention

According to the present invention, it is possible to provide a resin microparticle production method with improved processing capacity. In addition, it is possible to provide resin particles appropriate for microparticulation processing.

BRIEF DESCRIPTION OF DRAWINGS

FIG. 2 is a schematic diagram illustrating a state of washing in step S3 of the resin microparticle production method in an embodiment of the present invention.

DESCRIPTION OF EMBODIMENTS

Figure 1:
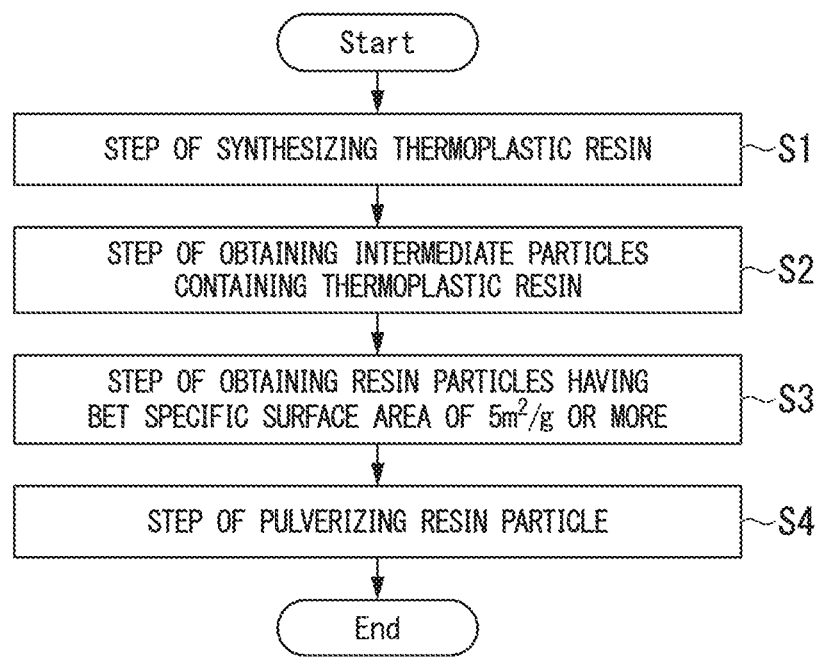
FIG. 1 is a flowchart illustrating a resin microparticle production method in an embodiment of the present invention.

A resin microparticle production method according to the present embodiment includes a step of pulverizing resin particles having a thermoplastic resin as a forming material and having a BET specific surface area of equal to or more than 5 m²/g using an impact type pulverizer.

In addition, resin particles according to the present embodiment have aromatic polyether as a forming material and have a BET specific surface area of equal to or more than 5 m²/g.

Hereinafter, the present invention will be described in order.

(Thermoplastic Resin)

As a thermoplastic resin used in the resin microparticle production method according to the present embodiment, a thermoplastic resin polymerized by solution polymerization is appropriately used.

As the thermoplastic resin used in the resin microparticle production method of the present embodiment, a thermoplastic resin having an aromatic group in a main chain is preferable. Examples of the aromatic group include a phenylene group, a biphenylene group, and a naphthylene group.

The main chain in the present specification means a longest chain structure.

In addition, as the thermoplastic resin used in the resin microparticle production method of the present embodiment, a thermoplastic resin having a sulfonyl group or a carbonyl group in the main chain is preferable.

In general, a thermoplastic resin having such a group in the main chain is excellent in solvent resistance and is hardly soluble in a solvent in many cases. When microparticles of the thermoplastic resin are produced by the resin microparticle production method of the invention of the present application, it is possible to improve a dissolution rate in a solvent, thereby improving workability.

Hereinafter, as a thermoplastic resin applicable to the resin microparticle production method of the present embodiment, aromatic polyether will be exemplified and described in detail.

Aromatic polyether has the following general formula (E) as a constituent unit.

[Chem. 1]

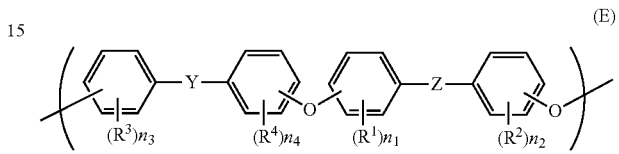

(In the formula, Y represents —$SO_2$— or —CO—. Z represents a single bond, an alkylidene group having 1 to 10 carbon atoms, —$SO_2$—, or —CO—. $R^1$, $R^2$, $R^3$ and $R^4$ each independently represents an alkyl group having 1 to 4 carbon atoms or an alkoxy group having 1 to 4 carbon atoms. $n_1$, $n_2$, $n_3$, and $n_4$ each independently represents an integer of 0 to 4. In a case where $n_1$, $n_2$, $n_3$, or $n_4$ is an integer of 2 to 4, a plurality of $R^1$, $R^2$, $R^3$ or $R^4$ may be the same as one another, or may be different from one another.)

In the formula (E), aromatic polyether in which Y is a sulfonyl group (—$SO_2$—), and Z is a single bond or an alkylidene group having 1 to 10 carbon atoms is referred to as aromatic polyether ether sulfone. In addition, in the formula (E), aromatic polyether in which Y and Z are a sulfonyl group (—$SO_2$—) is referred to as aromatic polyether sulfone.

In addition, aromatic polyether in which Y is a carbonyl group (—CO—) and Z is a single bond or an alkylidene group having 1 to 10 carbon atoms is referred to as aromatic polyether ether ketone. In addition, aromatic polyether in which Y and Z are a carbonyl group (—CO—) is referred to as aromatic polyether ketone.

Y and Z are preferably a sulfonyl group.

(Resin Microparticle Production Method)

FIG. 1 is a flowchart illustrating a resin microparticle production method in an embodiment of the present invention. A resin microparticle production method of the present embodiment includes a step of synthesizing a thermoplastic resin (step S1), a step of obtaining intermediate particles containing a thermoplastic resin (step S2), a step of obtaining resin particles having a BET specific surface area of equal to or more than 5 m²/g (step S3), and a step of pulverizing the resin particles (step S4).

In the following description, a case of using aromatic polyether will be described as an example of a thermoplastic resin.

(Step S1 of Synthesizing Thermoplastic Resin)

Aromatic polyether is obtained by polymerizing a dihalogeno compound (A) represented by the following general formula (A) (hereinafter, simply referred to as "dihalogeno compound (A)") and a divalent phenol (B) represented by the following general formula (B) (hereinafter, simply referred to as "divalent phenol (B)") as monomers.

[Chem. 2]

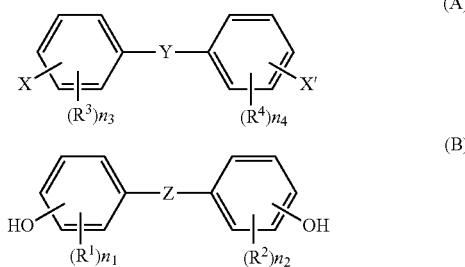

(In the formula, X and X' each independently represents a halogen atom. Y and Z are the same as described above. $R^1$, $R^2$, $R^3$ and $R^4$ are the same as described above. $n_1$, $n_2$, $n_3$, and $n_4$ are the same as described above. In a case where $n_1$, $n_2$, $n_3$, or $n_4$ is an integer of 2 to 4, a plurality of $R^1$, $R^2$, $R^3$ or $R^4$ may be the same as one another, or may be different from one another.)

The dihalogeno compound (A) is represented by the general formula (A).

In the formula, X and X' each independently represents a halogen atom. Examples of the halogen atom include a chlorine atom, a bromine atom, and an iodine atom, and the chlorine atom is preferable.

X and X' each independently may be bonded to any of carbon atoms of a second position, a third position, and a fourth position when a position number of a carbon atom bonded to Y is a first position, but the carbon atom of the fourth position is preferable.

Y represents —$SO_2$— or —CO— as described above, and is preferably —$SO_2$—.

That is, the dihalogeno compound (A) is preferably bis(4-chlorophenyl) sulfone to which any one or both of $R^3$ and $R^4$ may be bonded instead of a hydrogen atom.

In the formula, $R^3$ and $R^4$ each independently represents an alkyl group having 1 to 4 carbon atoms or an alkoxy group having 1 to 4 carbon atoms.

The alkyl group in $R^3$ and $R^4$ may be in any of a straight-chain shape, a branched shape, and a cyclic shape, but is preferably a straight-chain shape or a branched shape. Examples thereof include a methyl group, an ethyl group, an n-propyl group, an isopropyl group, an n-butyl group, an isobutyl group, a sec-butyl group, and a tert-butyl group.

The alkoxy group in $R^3$ and $R^4$ may be in any of a straight-chain shape, a branched shape, and a cyclic shape, but is preferably a straight-chain shape or a branched shape. Examples thereof include a methoxy group, an ethoxy group, an n-propoxy group, an isopropoxy group, an n-butoxy group, an isobutoxy group, a sec-butoxy group, and a tert-butoxy group.

In the formula, $n_3$ is a bond number of $R^3$, $n_4$ is a bond number of $R^4$, and $R^3$ and $R^4$ each independently represents an integer of 0 to 4.

In a case where $n_3$ and $n_4$ are other than 0, a bond position of corresponding $R^3$ and $R^4$ is not particularly limited as long as the bond position is other than a bond position of a halogen atom of X and X' and Y, and when the position number of the carbon atom to which a sulfonyl group of a benzene ring skeleton is bonded may be set as a first position, $R^3$ and $R^4$ may be bonded to any of carbon atoms of a second position, a third position, a fourth position, a fifth position, and a sixth position, $R^3$ and $R^4$ are preferably bonded to a carbon atom other than the fourth position, and are preferably bonded to carbon atoms of the third position and the fifth position.

In a case where $n_3$ or $n_4$ is an integer of 2 to 4, a plurality of $R^3$ or $R^4$ each independently may be the same as one another, or may be different from one another. For example, in a case where $n_3$ is an integer of 2 to 4, all of $n_3$ $R^3$ may be the same, or may be different, and in a case where n is 3 or 4, only some thereof may be the same. $n_4$ $R^4$ may be also the same.

$n_3$ and $n_4$ each independently is preferably an integer of 0 to 3, more preferably an integer of 0 to 2, and particularly preferably 0 or 1.

Preferable examples of the dihalogeno compound (A) include bis(4-chlorophenyl) sulfone (also referred to as 4,4'-dichlorodiphenyl sulfone).

The divalent phenol (B) is represented by the following general formula (B).

In the divalent phenol (B), two hydroxy groups (—OH) may be bonded to any of carbon atoms of a second position, a third position, and a fourth position when the position number of carbon atoms to which Z is bonded is set as a first position, but is preferably bonded to a carbon atom of the fourth position.

Z represents a single bond, an alkylidene group having 1 to 10 carbon atoms, —$SO_2$—, or —CO—, as described above, and is preferably —$SO_2$—.

In the formula, $R^1$ and $R^2$ each independently represents an alkyl group having 1 to 4 carbon atoms or an alkoxy group having 1 to 4 carbon atoms, and $R^3$ and $R^4$ are the same.

In addition, $n_1$ is a bond number of $R^1$, $n_2$ is a bond number of $R^2$, and $n_1$ and $n_2$ each independently represents an integer of 0 to 4. $n_1$ and $n_2$ are the same as $n_3$ and $n_4$.

That is, in a case where $n_1$ and $n_2$ are other than 0, a bond position of corresponding $R^1$ and $R^2$ is not particularly limited as long as the bond position of corresponding $R^1$ and $R^2$ is other than bond positions of a hydroxy group or Z, and when a position number of a carbon atom to which a sulfonyl group of benzene ring skeleton is bonded is set as a first position, $R^1$ and $R^2$ may be bonded to any of carbon atoms of a second position, a third position, a fourth position, a fifth position, and a sixth position, preferably bonded to carbon atoms other than those of the fourth position, and preferably bonded to carbon atoms of the third position and the fifth position.

In a case where $n_1$ or $n_2$ is an integer of 2 to 4, a plurality of $R^1$ and $R^2$ may be the same as one another, or may be different from one another. For example, in a case where $n_1$ is an integer of 2 to 4, all of $n_1$ $R^1$ may be the same, or may be different, and in a case where $n_1$ is 3 or 4, some of $n_1$ $R^1$ may be the same. $n_2$ $R^2$ is also the same.

$n_1$ and $n_2$ each independently may be preferably an integer of 0 to 3, more preferably an integer of 0 to 2, and particularly preferably 0 or 1.

Examples of preferable divalent phenol (B) include bis(4-hydroxyphenyl) sulfone and bis(4-hydroxy-3,5-dimethylphenyl) sulfone to which any one or both of $R^1$ and $R^2$ may be bonded instead of a hydrogen atom.

Polymerization (polycondensation) of the dihalogeno compound (A) and the divalent phenol (B) is preferably performed by using an alkali metal salt of carbonic acid as a base, is preferably performed in an organic solvent as a polymerization solvent, and is more preferably performed in an organic solvent by using an alkali metal salt of carbonic acid as a base.

The alkali metal salt of a carbonic acid may be alkali carbonate (carbonate of alkali metal) which is a normal salt, may be alkali bicarbonate (alkali hydrogen carbonate, hydrogen carbonate of alkali metal) which is an acid salt, or may be a mixture of these (alkali carbonate and alkali bicarbonate).

Preferable examples of the alkali carbonate include sodium carbonate, potassium carbonate, and the like.

Preferable examples of the alkali bicarbonate include sodium bicarbonate (also referred to as sodium hydrogen carbonate), potassium bicarbonate (also referred to as potassium hydrogen carbonate), and the like.

The organic solvent is preferably an organic polar solvent.

Examples of such organic polar solvents include dimethyl sulfoxide (melting point: 19° C.), 1-methyl-2-pyrrolidone (melting point: −24° C.), sulfolane (1,1-dioxochiran) (melting point: 27.5° C.), 1,3-dimethyl-2-imidazolidinone (melting point: 8.2° C.), 1,3-diethyl-2-imidazolidinone, dimethyl sulfone (melting point: 109° C.), diethyl sulfone (melting point: 73° C.), diisopropyl sulfone, diphenyl sulfone (melting point: 127° C.), and the like.

First, the dihalogeno compound (A) and the divalent phenol (B) are dissolved in an organic solvent.

A temperature of dissolving the dihalogeno compound (A) and the divalent phenol (B) is, for example, in a range of 40° C. to 180° C.

A total mass of the dihalogeno compound (A) and the divalent phenol (B) with respect to 1 kg of the organic solvent is 0.3 to 3.0 kg, and is preferably 0.5 to 1.7 kg. When the total mass of the dihalogeno compound (A) and the divalent phenol (B) with respect to 1 kg of the organic solvent is 0.3 to 3.0 kg, intermediate particles to be described below include an appropriate amount of the organic solvent.

Subsequently, by adding an alkali metal salt of carbonate to a mixture solution obtained by dissolving the dihalogeno compound (A) and the divalent phenol (B) in an organic solvent, the dihalogeno compound (A) and the divalent phenol (B) are polymerized. Hereinafter, a mixture solution including an aromatic polyether generated by polymerization, an organic solvent, and a salt derived from an alkali metal salt of carbonate is referred to as a reaction mixture.

A ratio of the alkali metal salt of carbonate with respect to the divalent phenol (B) is 47 to 52 mol %, and is more preferably 48 to 51 mol %. When the ratio of the alkali metal salt of carbonate is 47 to 52 mol %, intermediate particles to be described later include an appropriate amount of salt derived from the alkali metal salt of carbonate.

A polymerization temperature is preferably 160° C. to 400° C.

In addition, in the polymerization, the temperature is gradually raised while removing by-produced water to reach a reflux temperature of the organic polar solvent, and the temperature may be preferably maintained for 1 to 50 hours, and more preferably maintained for 2 to 30 hours.

If side reactions do not occur, the higher the polymerization temperature becomes, or the longer the polymerization time becomes, polymerization to be performed proceeds, and a degree of polymerization of the obtained aromatic polyether becomes high. As a result, there is a tendency that a reduced viscosity of aromatic polyether becomes high, and a number-average molecular weight Mn becomes large. During the polymerization, a polymerization temperature is adjusted such that aromatic polyether having a predetermined reduced viscosity or Mn is obtained.

A method of polymerization is not limited to the above-described method. For example, polymerization may be performed by reacting the divalent phenol (B) and an alkali metal salt of carbonate in an organic solvent, removing by-produced water, and adding the dihalogeno compound (A) to the obtained reaction mixture.

The reduced viscosity of the obtained aromatic polyether is preferably equal to or less than 0.36 dL/g.

In addition, the reduced viscosity of the aromatic polyether is preferably equal to or more than 0.18 dL/g.

The reduced viscosity of the aromatic polyether is preferably 0.18 to 0.36 dL/g, and more preferably 0.22 to 0.28 dL/g. The higher the reduced viscosity of the aromatic polyether becomes, heat resistance or strength and rigidity are easily improved, but if the reduced viscosity is higher than 0.36 dL/g, a melting temperature or a melt viscosity easily becomes high, and fluidity easily becomes low.

In the present specification, as a reduced viscosity (Rv) of the aromatic polyether, a value measured by the following method is employed.

First, approximately 1 g of the aromatic polyether is precisely weighed, dissolved in N,N-dimethyl formamide, the volume is set as 1 dL, and a viscosity ($\eta$) of the solution is measured at 25° C. by using an Ostwald type viscosity tube. In addition, a viscosity ($\eta_0$) of N,N-dimethyl formamide which is a solvent is measured at 25° C. by using an Ostwald type viscosity tube.

From the obtained viscosity ($\eta$) of the solution and viscosity ($\eta_0$) of the solvent, a specific viscosity (($\eta-\eta_0$)/($\eta_0$)) is obtained. A value obtained by dividing the obtained specific viscosity by a concentration (approximately 1 g/dL) of the solution used for measurement is regarded as a reduced viscosity (dL/g) of aromatic polyether.

(Step S2 of Obtaining Intermediate Particles Containing Thermoplastic Resin)

Subsequently, a thermoplastic resin is precipitated from a reaction mixture obtained in the step of polymerizing a thermoplastic resin, and intermediate particles containing the thermoplastic resin (hereinafter, referred to as intermediate particles) are obtained.

In a case of using an organic solvent having a relatively high melting point (specifically, a melting point is equal to or more than 40° C.) as a polymerization solvent, by cooling a reaction mixture to a melting point of the solvent used at the time of polymerization or less, the solvent and aromatic polyether contained in the reaction mixture are precipitated. Simultaneously, the entirety of the reaction mixture is solidified. Thereafter, by mechanically pulverizing the obtained solid, it is possible to obtain intermediate particles. The obtained intermediate particles include the solvent and a salt contained in the reaction mixture used at the time of polymerization as solids.

As other methods, it is possible to obtain intermediate particles by mixing a reaction mixture product and a poor solvent of aromatic polyether and precipitating aromatic polyether contained in the reaction mixture product. At this time, the precipitated aromatic polyether may be pulverized at an appropriate size to obtain the intermediate particles. The reaction mixture is, for example, cooled to room temperature. The obtained intermediate particles include the solvent and a salt included in the reaction mixture and used at the time of polymerization. Examples of the poor solvent of aromatic polyether include methanol, ethanol, 2-propanol, hexane, heptane, and water.

A median particle diameter (median diameter) $D_{50}$ of the intermediate particles is, for example, 200 μm to 1,000 μm.

The median particle diameter (median diameter) $D_{50}$ of the intermediate particles can be measured by a laser diffraction dry measurement method. More specifically, under the following condition, a particle distribution is measured by a laser diffraction cyclic measurement method using a particle size distribution measurement apparatus (manufactured by Malvern Corporation, Mastersizer 2000), and the median particle diameter $D_{50}$ is obtained from the measurement result.

Pre-preparation: A small amount of sample (several g) is set to a dispersion unit (manufactured by Malvern Corporation, scirocco 2000).

Measurement method: A dry method
Particle refractive index: 1.65
Dispersion air pressure: 2.8 bar (1 bar=100 kPa)
Analysis mode: MS2000 general purpose
Median particle diameter $D_{50}$: Particle diameter data corresponding to cumulative 50 vol % of the obtained particle size distribution result (Step S3 of Obtaining Resin Particles Having BET Specific Surface Area of Equal to or More than 5 $m^2/g$)

Subsequently, intermediate particles are washed to obtain resin particles having a BET specific surface area of equal to or more than 5 $m^2/g$. FIG. 2 is a schematic view illustrating an aspect of washing in Step S3. In FIG. 2, intermediate particles are indicated as reference numeral 100, and the resin particles obtained by washing are indicated as reference numeral 150.

The illustrated intermediate particles 100 include a resin portion 101 in which aromatic polyether has been solidified, a salt 102 of which at least a part is included in the resin portion 101, and a polymerization solvent 103 of which at least a pan is included in the resin portion 101.

A ratio of the resin portion 101 with respect to a mass of the intermediate particles 100 is 20% by mass to 60% by mass, and more preferably 30% by mass to 50% by mass. As the ratio of the resin portion 101 is 20% by mass to 60% by mass, it is possible to set a BET specific surface area of the resin particles to be 5 $m^2/g$.

For washing of the intermediate particles 100, it is preferable to use water or hot water. By washing the intermediate particles 100 with water or hot water, it is possible to remove a water-soluble salt 102 such as a non-reactive base included in intermediate particles and by-produced halogenized alkali metal salt. When the salt 102 is removed, a void 109 is generated at a site where the salt 102 was present.

In addition, it is preferable to wash the intermediate particles 100 by using an organic solvent. By washing the intermediate particles 100 with an organic solvent, it is possible to remove a polymerization solvent 103 in which the intermediate particles 100 are included. At this time, in a case where the removed polymerization solvent 103 is solidified in the intermediate particles 100, the void 109 is generated at a site where the polymerization solvent 103 was present.

Examples of a washing solution used for washing include alcohols such as methanol, ethanol, and 2-propanol, ketones such as acetone, methyl ethyl ketone, ethers such as diethyl ether, and esters such as ethyl acetate and butyl acetate. These may be used alone, or two or more by mixing with one another. Depending on the kind of the polymerization solvent 103 to be removed, appropriate selection can be made.

The particles (resin portion 101) after washing are appropriately washed with water, the salt and the organic solvent included in the void 109 are replaced with water, and then dried to obtain resin particles 150 having a plurality of voids 109.

The order of washing using water or hot water and washing using the organic solvent may be reversed. In addition, the order of washing using water or hot water and washing using the organic solvent may be reversed. At this time, after performing washing using water or hot water a plurality of times, washing using the organic solvent may be performed a plurality of times, and washing using water or hot water and washing using the organic solvent may be alternately performed a plurality of times.

Here, in the present embodiment, at the time of washing of the intermediate particles 100, the intermediate particles 100 are preferably in a fixed phase. For example, at the time of washing of the intermediate particles 100, it is preferable to use a fixed bed type washing apparatus. The "fixed bed type washing apparatus" in the present application indicates an apparatus of a type for washing the intermediate particles 100 in a state of fixing the intermediate particles 100 in a container accommodating the intermediate particles 100 which are washing subjects in a washing apparatus. In a washing apparatus having such a configuration, as the intermediate particles 100 do not flow and the washing solution passes through the inside of particles or between particles, it is possible to elute impurities (salt 102, polymerization solvent 103) from the intermediate particles 100 to the washing solution.

As the fixed bed type washing apparatus, for example, a washing apparatus in which intermediate particles 100 are filled in a column, and a washing solution is distributed from a column upper portion, a washing apparatus in which a washing solution is distributed by a centrifugal force, or a washing apparatus in which a washing solution is distributed by pressurization or a reduced pressure is exemplified. The washing solution may be provided such that the intermediate particles 100 are immersed in the washing solution, or may be provided by being sprayed on a surface of the intermediate particles 100.

In a fixed bed type washing apparatus of the above-described method using a column, a pressure may be applied to a washing liquid surface or a normal pressure may be applied thereto.

A passing liquid amount of the washing solution is preferably 30 kg to 1,000 kg, more preferably 50 kg to 500 kg, and further more preferably 100 kg to 400 kg, with respect to 1 kg of the resin particles 150 included in the intermediate particles 100. In a column type fixed bed type washing apparatus, such an amount of washing solution is preferably fed in a state in which an upper surface of cake made of the intermediate particles 100 filled in a column is immersed in the washing solution. Here, an amount of the resin particles 150 included in the intermediate particles 100 can be estimated from a charge amount of a monomer or a past reaction result.

In addition, a height (cake height) of the intermediate particles 100 provided a fixed bed type washing apparatus is preferably 30 cm to 200 cm, and more preferably 50 cm to 150 cm. There is a tendency that, by setting the cake height to be equal to or less than 200 cm, it is possible to suppress collapse of the intermediate particles 100 due to their own weight. In addition, there is a tendency that, by setting the cake height to be equal to or more than 30 cm, it is possible to obtain sufficient washing efficiency. That is, by setting the cake height in the range described above, it is possible to more preferably obtain resin particles having a BET specific surface area of equal to or more than 5 $m^2/g$.

When washing the intermediate particles 100, for example, a method of stirring and dispersing the intermediate particles 100 in a washing solution and then removing the washing solution, such as repulp washing which is generally used, is also considered. However, when washing was performed while causing the intermediate particles 100 to flow, the inventors found that resin particles having a BET specific surface area of equal to or more than 5 $m^2/g$ as a subject are hardly obtained.

In the present embodiment, by performing washing having the intermediate particles 100 as a fixed phase as described above, for example, by washing the resin particles using a fixed bed type washing apparatus, it is possible to preferably obtain resin particles 150 having a BET specific surface area of equal to or more than 5 $m^2/g$. The resin particles 150 obtained as above correspond to the "resin particles" in the present invention. The resin particles are raw materials used in production of resin microparticles.

The BET specific surface area of the resin particles 150 is preferably equal to or more than 7 $m^2/g$, and more preferably equal to or more than 10 $m^2/g$. In addition, the BET specific surface area of the resin particles 150 is preferably as wide as possible, but is in a certain range considering the ease of production. The BET specific surface area of the resin particles 150 is preferably equal to or less than 100 $m^2/g$, more preferably equal to or less than 50 $m^2/g$, and further more preferably equal to or more than 30 $m^2/g$.

An upper limit and a lower limit of the BET specific surface area can be optionally combined with each other. For example, the BET specific surface area is preferably 5 $m^2/g$ to 100 $m^2/g$, more preferably 7 $m^2/g$ to 50 $m^2/g$, and further more preferably 10 $m^2/g$ to 30 $m^2/g$.

A pore volume of the resin particles 150 is preferably equal to or more than 0.08 $cm^3/g$, and more preferably equal to or more than 0.1 $cm^3/g$. In addition, the pore volume of the resin particles 150 is preferably as large as possible, but may be in a certain range considering the ease of production. The pore volume of the resin particles 150 is preferably equal to or more than 0.6 $cm^3/g$, and more preferably equal to or less than 0.4 $cm^3/g$.

An upper limit and a lower limit of the pore volume can be optionally combined. For example, the pore volume is preferably 0.08 $cm^3/g$ to 0.6 $cm^3/g$, and more preferably 0.1 $cm^3/g$ to 0.4 $cm^3/g$.

In the present specification, the BET specific surface area and the pore volume can be measured by using a BET specific surface area meter. More specifically, under the following condition, the values are values measured by a nitrogen adsorption method.

Pretreatment method: Vacuum degassing is performed at 120° C. for 8 hours using a vacuum heat pretreatment apparatus (manufactured by MicrotracBell Corporation, BELPREP-vacII).

Measurement method: Under the following condition, by performing measurement using a specific surface area meter (manufactured by MicrotracBell Corporation, BELSORP-mini), an adsorption-desorption isotherm of nitrogen is measured using a constant volume method, and calculated by a BET method.

Adsorption temperature: 77K
Adsorbate sectional area: 0.162 $nm^2$
Adsorbate: nitrogen
Equilibrium standby time: 500 seconds
Saturation steam pressure: Actually measured The BET specific surface area is affected by a particle size, but in the resin particles 150 of the present embodiment, an amount of the void 109 formed in the resin particles 150 is more dominant. For example, in a case of resin particles having an average particle diameter of 200 μm that have no void therein, the BET specific surface area becomes much lower than 5 $m^2/g$, but in the resin particles 150 of the present invention, as a plurality of voids 109 are present inside, a BET specific surface area of equal to or more than 5 $m^2/g$ is realized. That is, the resin particles in the present embodiment are particles having a plurality of voids therein.

(Step S4 of Pulverizing Resin Particles)

Subsequently, the resin particles 150 having a BET specific surface area of equal to or more than 5 $m^2/g$ are pulverized using an impact type pulverizer to obtain microparticles of a thermoplastic resin. In Step S4, a median particle diameter $D_{50}$ of the resin particles 150 is preferably equal to or more than 200 μm, and more preferably 200 μm to 1,000 μm. In addition, in Step S4, the median particle diameter $D_{50}$ of the obtained resin microparticles is preferably equal to or less than 100 μm, and more preferably 10 μm to 100 μm.

That is, in Step S4, the resin particles 150 having a BET specific surface area of equal to or more than 5 $m^2/g$ are pulverized using an impact type pulverizer such that the median particle diameter $D_{50}$ of the obtained resin particles is preferably 10 μm to 100 μm.

In the present embodiment, since the resin particles 150 as a pulverization subject are porous, it is possible to easily perform pulverization at normal temperature. Therefore, efficiency of pulverization processing is improved compared to a method in the related art in which the pulverization subject is solid resin particles.

As the impact type pulverizer, a commercially available device can be appropriately used. As the commercially available impact type pulverizer, for example, an ACM Pulverizer (manufactured by Hosokawa Micron Corporation) and the like can be used.

As a condition of pulverizing the resin particles 150 having a BET specific surface area of equal to or more than 5 $m^2/g$ using an impact type pulverizer, it is preferable that, at normal temperature, a pulverizer current be 45 to 71 A (30 to 35 A at the time of idling), a classifier current be 6.5 to 7.5 A (6.0 to 7.0 A at the time of idling), a feed rate of the resin particles 150 be 30 to 40 kg/hr, and an operation time be equal to or longer than 10 min.

The resin microparticles produced in such a manner can shorten a dissolution time for dissolving into a liquid such as a monomer of a thermoplastic resin. For this reason, the resin microparticles produced by the resin microparticle production method of the present embodiment are excellent in productivity in production of a composite including a thermosetting resin and aromatic polyether.

The resin microparticle production method and the resin particles of the present embodiment have the above-described structure.

According to the production method of the resin microparticles having such a structure, processing capability of micronizing processing using an impact type pulverizer at normal temperature is improved.

In addition, the resin particles having the above-described structure are appropriate for micronizing processing at normal temperature.

Another aspect of the present invention is a resin microparticle production method including a step of pulverizing resin particles of a thermoplastic resin having a BET specific surface area of 5 m$^2$/g to 100 m$^2$/g and having a sulfonyl group in a main chain using an impact type pulverizer.

Prior to the pulverizing step, a step of synthesizing the thermoplastic resin by polymerizing the general formula (A) and the general formula (B) in a solvent, a step of obtaining intermediate particles containing the thermoplastic resin by precipitating the thermoplastic resin from a reaction mixture obtained in the synthesizing step, and a step of obtaining resin particles by washing the obtained intermediate panicles as a solid phase may be included, Y in the general formula (A) is —SO$_2$—, X and X' each independently represents a halogen atom, R$^3$ and R$^4$ each independently represents an alkyl group having 1 to 4 carbon atoms or an alkoxy group having 1 to 4 carbon atoms, n$_3$ and n$_4$ is 0 or 1, Z in the general formula (B) is —SO$_2$—, R$^1$ and R$^2$ each independently represents an alkyl group having 1 to 4 carbon atoms or an alkoxy group having 1 to 4 carbon atoms, and n$_1$ and n$_2$ are 0 or 1.

A pore volume of the resin particle may be equal to or more than 0.08 cm$^3$/g and equal to or less than 0.6 cm$^3$/g.

Another aspect of the present invention is a resin particle production method including a step of synthesizing the thermoplastic resin by polymerizing a monomer in a solvent, a step of obtaining intermediate particles containing the thermoplastic resin by precipitating the thermoplastic resin from a reaction mixture obtained in the synthesizing step, and a step of obtaining resin particles by washing the obtained intermediate particles as a solid phase.

The resin particles produced by the resin particle production method may be resin particles including aromatic polyether sulfone and having a BET specific surface area of equal to or more than 5 m$^2$/g.

EXAMPLES

Hereinafter, the present invention will be described using examples, but the present invention is not limited to the examples.

In the present example, each of physical properties was measured by the following measurement method.

(BET Specific Surface Area, Pore Volume)

A BET specific surface area and a pore volume of the particle were measured by a nitrogen adsorption method under the following condition.

Pretreatment method: Vacuum degassing was performed at 120° C. for 8 hours.

Measurement method: An adsorption-desorption isotherm of nitrogen was measured using a constant volume method.

Adsorption temperature: 77 K
Adsorbate sectional area: 0.162 nm$^2$
Adsorbate: nitrogen
Equilibrium standby time: 500 seconds
Saturation steam pressure: Actually measured
BET specific surface area: Calculated by a BET method
Pore volume: Calculated by a BJH method
Measurement apparatus: BET specific surface area meter (manufactured by MicrotracBell Corporation, BELSORP-mini)
Pretreatment apparatus: Vacuum heat pretreatment apparatus (manufactured by MicrotracBell Corporation, BEL-PREP-vacII)

(Median Particle Diameter D$_{50}$)

A particle size distribution was measured by a laser diffraction dry measurement method and a median particle diameter D$_{50}$ of a particle is obtained from the measurement result.

Pre-preparation: A small amount (several g) of a sample is set in a dispersion unit.

Measurement method: A particle size distribution was measured by a laser diffraction dry measurement method.

Measurement method: A dry method
Particle refractive index: 1.65
Dispersion air pressure: 2.8 bar (1 bar=100 kPa)
Analysis mode: MS2000 general purpose
Median particle diameter D$_{50}$: Particle diameter data corresponding to cumulative 50 vol % of the obtained particle size distribution result
Measurement apparatus: A particle size distribution measurement apparatus (manufactured by Malvern Corporation, Mastersizer 2000)
Dispersion unit: Dispersion unit (manufactured by Malvern Corporation, scirocco 2000)

(Reduced Viscosity Rv)

First, approximately 1 g of aromatic polyether was precisely weighed, dissolved in N,N-dimethylformamide, the volume was set as 1 dL, and a viscosity (η) of the solution was measured at 25° C. using an Ostwald type viscosity tube. In addition, the viscosity (η$_0$) of N,N-dimethylformamide which is a solvent was measured at 25° C. using an Ostwald type viscosity tube.

From the obtained viscosity (η) of the solution and the viscosity (η$_0$) of the solvent, a specific viscosity ((η−η$_0$)/η$_0$) was obtained. A value obtained by dividing the obtained specific viscosity by a concentration (approximately 1 g/dL) of the solution used in measurement was regarded as a reduced viscosity (dL/g) of aromatic polyether.

(Residual Diphenyl Sulfone)

A washed state of the resin particle was checked by measuring an amount of residual diphenyl sulfone of the resin particle.

Approximately 1 g of the resin particle was precisely weighed, and added to a mixture solution of acetone:methanol=6 mL:4 mL. Stirring was performed at room temperature for 1 hour to extract diphenyl sulfone in the resin particle to the mixture solvent, and diphenyl sulfone in the mixture solvent was quantified by gas chromatography.

Example 1

Bis(4-hydroxyphenyl) sulfone (300.3 g, 1.20 mol), bis(4-chlorophenyl) sulfone (331.5 g, 1.16 mol), and diphenyl sulfone (560.9 g) as a polymerization solvent were charged in a polymerization vessel equipped with a stirrer, a nitrogen introduction tube, a thermometer, and a capacitor attached with a receiver in the tip end, and the temperature was raised to 180° C. while distributing nitrogen gas in the system.

Subsequently, potassium carbonate (160.1 g, 1.16 mol) was added to the obtained solution, the temperature was gradually raised to 290° C., and reaction was further performed at 290° C. for 3 hours to polymerize polyether sulfone (PES).

Subsequently, the obtained reaction solution was cooled and solidified, and then the obtained solid was finely pulverized to obtain intermediate particles containing a thermoplastic resin. A BET specific surface area of the obtained intermediate particles was 0.25 m$^2$/g.

Subsequently, the obtained intermediate particles were dispersed in warm water (60° C.), and washed by stirring. A BET specific surface area of the intermediate particles after washing with warm water was 0.28 m$^2$/g. Subsequently, a mixture solvent of acetone/methanol (acetone:methanol=50:50) was dispersed and washed by stirring.

Subsequently, the intermediate particles after washing were filled in a column type fixed bed washer. The mixture solvent of acetone/methanol (acetone:methanol=50:50) was dipped from above the fixed bed washer to further wash the intermediate particles.

At this time, a temperature of the mixture solvent was 20° C. In addition, 1 kg of resin particles contained in the intermediate particles filled in the fixed bed type washer was washed using 250 kg of the mixture solvent as a washing solution. A height (cake height) of the resin particles filled in the column was 110 cm.

The obtained solid was heated and dried at 150° C. to obtain resin particles of Example 1. In the obtained resin particles, a BET specific surface area=17.0 m$^2$/g, $D_{50}$=480 μm, RV=0270, and residual diphenyl sulfone was equal to or less than 0.4% by mass.

Example 2

By the same operation as that of Example 1 except that the washing condition using a fixed bed type washer was changed, resin particles of Example 2 were obtained. In the obtained resin particles, a BET specific surface area=14.1 m$^2$/g, $D_{50}$=550 μm, RV=0.274, and residual diphenyl sulfone was equal to or less than 0.4% by mass.

Comparative Example 1

The intermediate particles obtained by the same operation as that of Example 1 were dispersed in warm water (60° C.) in a washing tank equipped with a stirrer, stirred washing was performed, and then solid-liquid separation was performed. Stirred washing with warm water was performed three times.

In addition, the obtained intermediate particles after warm water washing were dispersed in a mixture solvent of acetone/methanol (acetone:methanol=50:50) in a washing tank equipped with a stirrer, and then solid-liquid separation was performed. Stirred washing with the mixture solvent of acetone/methanol was performed four times. At this time, for each washing, 1 kg of resin particles contained in the intermediate particles after warm water washing was washed using 15 kg of the mixture solvent as a washing solution.

The obtained solid was further washed with water.

The obtained solid was heated and dried at 150° C. to obtain resin particles of Comparative Example 1. In the obtained resin particles, a BET specific surface area=3.7 m$^2$/g, $D_{50}$=760 μm, RV=0.261, and residual diphenyl sulfone was equal to or less than 0.4% by mass.

Comparative Example 2

By the same operation as that of Comparative Example 1 except that the stirring rate in the stirred washing was changed, resin particles of Comparative Example 2 were obtained. In the obtained resin particles, a BET specific surface area=4.1 m$^2$/g, $D_{50}$=670 μm, RV=0.278, and residual diphenyl sulfone was equal to or less than 0.4% by mass.

The resin particles obtained in Examples 1 and 2 and Comparative Examples 1 and 2 were pulverized at normal temperature by an impact type pulverizer (manufactured by Hosokawa Micron Corporation, ACM pulverizer) to obtain resin microparticles of aromatic polyether sulfone. At this time, a feed rate was adjusted such that pulverization load of the apparatus was the maximum so as to obtain maximum processing capacity.

The result is shown in the following Table 1.

TABLE 1

|  | Resin particle | | | | Resin microparticle | |
| --- | --- | --- | --- | --- | --- | --- |
|  | Median particle diameter (μm) | Reduced viscosity (dL/g) | BET specific surface area (m$^2$/g) | Pore volume (cm$^3$/g) | Median particle diameter (μm) | Processing capacity (kg/time) |
| Example 1 | 480 | 0.270 | 17.0 | 0.191 | 40.1 | 39 |
| Example 2 | 550 | 0.274 | 14.1 | 0.133 | 30.3 | 37 |
| Comparative Example 1 | 760 | 0.261 | 3.7 | 0.046 | 38.7 | 22 |
| Comparative Example 2 | 670 | 0.278 | 4.1 | 0.052 | 41.6 | 24 |

As a result of evaluation, in a case of using the resin particles of Examples 1 and 2, processing capacity of pulverization processing was improved compared to a case of using the resin particles of Comparative Examples 1 and 2.

From the above result, it was found that the present invention is useful.

INDUSTRIAL APPLICABILITY

According to the present invention, it is possible to provide a resin microparticle production method with improved processing capacity and resin particles appropriate for micronization processing.

REFERENCE SIGNS LIST

100 . . . Intermediate particles, 101 . . . Resin portion, 102 . . . Salt impurities, 103 . . . Polymerization solvent, 109 . . . Void, 150 . . . Resin particles

The invention claimed is:

1. A resin microparticle production method, comprising:
   a step of pulverizing resin particles which are a thermoplastic resin of an aromatic polyether sulfone having a BET specific surface area of equal to or more than 5 m$^2$/g using an impact type pulverizer;
   wherein a median particle diameter D$_{50}$ of the resin particles is equal to or more than 200 and wherein a median particle diameter D$_{50}$ of the resin microparticle is equal to or less than 100 μm.

2. The resin microparticle production method according to claim 1, further comprising:
   a step of synthesizing the thermoplastic resin by polymerizing a monomer in a solvent;
   a step of precipitating the thermoplastic resin from a reaction mixture obtained in the synthesizing step to obtain intermediate particles containing the thermoplastic resin; and
   a step of washing the obtained intermediate particles in a fixed phase to obtain the resin particles, prior to the pulverizing step.

3. The resin microparticle production method according to claim 1,
   wherein the thermoplastic resin has a sulfonyl group in the main chain.

4. The resin microparticle production method according to claim 3,
   wherein the thermoplastic resin is aromatic polyether sulfone.

5. The resin microparticle production method according to claim 1,
   wherein a reduced viscosity (Rv) of the thermoplastic resin is equal to or less than 0.36 dL/g.

6. The resin microparticle production method according to claim 2,
   wherein the thermoplastic resin has an aromatic group in a main chain.

7. The resin microparticle production method according to claim 6,
   wherein the thermoplastic resin has a sulfonyl group in the main chain.

8. The resin microparticle production method according to claim 2,
   wherein a reduced viscosity (Rv) of the thermoplastic resin is equal to or less than 0.36 dL/g.

9. The resin microparticle production method according to claim 1,
   wherein a reduced viscosity (Rv) of the thermoplastic resin is equal to or less than 0.36 dL/g.

10. The resin microparticle production method according to claim 3,
    wherein a reduced viscosity (Rv) of the thermoplastic resin is equal to or less than 0.36 dL/g.

11. The resin microparticle production method according to claim 4,
    wherein a reduced viscosity (Rv) of the thermoplastic resin is equal to or less than 0.36 dL/g.

12. The resin microparticle production method according to claim 1,
    wherein the aromatic polyether sulfone has general formula (E) as a constituent unit,

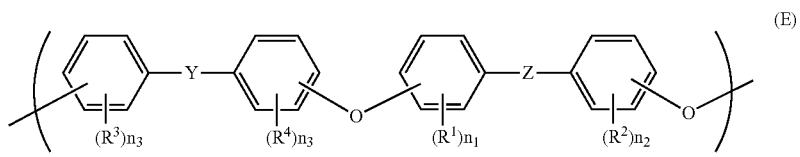

wherein Y represents —SO$_2$—, Z represents a single bond, an alkylidene group having 1 to 10 carbon atoms, —SO$_2$—, or —CO—, R$^1$, R$^2$, R$^3$ and R$^4$ each independently represents an alkyl group having 1 to 4 carbon atoms or an alkoxy group having 1 to 4 carbon atoms, and n$_1$, n$_2$, n$_3$, and n$_4$ each independently represents an integer of 0 to 4, and when n$_1$, n$_2$, n$_3$, or n$_4$ is an integer of 2 to 4, a plurality of R$^1$, R$^2$, R$^3$ or R$^4$ may be the same or different from one another.

* * * * *